United States Patent
Ko et al.

(10) Patent No.: US 11,553,479 B2
(45) Date of Patent: Jan. 10, 2023

(54) METHOD AND APPARATUS FOR TRANSMITTING S-SSB IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/648,602

(22) Filed: Jan. 21, 2022

(65) Prior Publication Data

US 2022/0150877 A1    May 12, 2022

Related U.S. Application Data

(63) Continuation of application No. PCT/KR2020/010826, filed on Aug. 14, 2020.

(60) Provisional application No. 62/887,565, filed on Aug. 15, 2019.

(51) Int. Cl.
*H04W 72/04* (2009.01)
*H04W 48/10* (2009.01)

(52) U.S. Cl.
CPC ......... *H04W 72/042* (2013.01); *H04W 48/10* (2013.01); *H04W 72/0446* (2013.01)

(58) Field of Classification Search
CPC ............... H04W 72/032; H04W 48/10; H04W 72/0446; H04W 72/0406; H04W 8/22; H04W 76/14; H04W 72/044
See application file for complete search history.

(56) References Cited

U.S. PATENT DOCUMENTS

| 2017/0353936 | A1* | 12/2017 | Zhang | H04W 72/005 |
| 2018/0007726 | A1* | 1/2018 | Li | H04W 76/10 |
| 2018/0019904 | A1* | 1/2018 | Lee | H04W 56/00 |
| 2019/0200309 | A1 | 6/2019 | Zeng et al. | |
| 2019/0222286 | A1 | 7/2019 | Miao | |

(Continued)

FOREIGN PATENT DOCUMENTS

| KR | 10-2019-0010507 | 1/2019 |
| WO | 2019023423 | 1/2019 |

OTHER PUBLICATIONS

PCT International Application No. PCT/KR2020/010826, International Search Report dated Nov. 6, 2020, 4 pages.

(Continued)

*Primary Examiner* — Chi Ho A Lee
*Assistant Examiner* — Andrew Lee
(74) *Attorney, Agent, or Firm* — Lee Hong Degerman Kang Waimey

(57) ABSTRACT

According to an embodiment of the present disclosure, provided is a method by which a first apparatus performs sidelink communication. The method comprises the steps of: receiving, from a base station, information about an S-SSB transmission resource; determining, on the basis of the information about the S-SSB transmission resource, a plurality of first slots within a first S-SSB period having an S-SSB period length, associated with a plurality of first S-SSBs; transmitting, to a second apparatus, the plurality of first S-SSBs on the plurality of first slots, wherein a slot interval between the plurality of first slots may be the same within the first S-SSB period.

18 Claims, 27 Drawing Sheets

(56) References Cited

U.S. PATENT DOCUMENTS

| | | | |
|---|---|---|---|
| 2020/0015214 A1* | 1/2020 | Si | H04W 72/044 |
| 2020/0153574 A1* | 5/2020 | Shin | H04W 76/14 |
| 2020/0229114 A1* | 7/2020 | Ryu | H04L 5/0091 |
| 2021/0051610 A1* | 2/2021 | Akkarakaran | H04W 56/0025 |
| 2021/0234663 A1* | 7/2021 | Kim | H04W 72/0406 |
| 2021/0320749 A1* | 10/2021 | Liu | H04W 4/40 |
| 2021/0368460 A1* | 11/2021 | Fakoorian | H04W 8/22 |
| 2021/0410084 A1* | 12/2021 | Li | H04W 52/265 |
| 2022/0046598 A1* | 2/2022 | Zhao | H04W 72/02 |

OTHER PUBLICATIONS

Spreadtrum Communications, "Discussion on synchronization mechanism for NR V2X," R1-1906364, 3GPP TSG RAN WG1 Meeting #97, May 2019, 12 pages.

Huawei et al., "Sidelink synchronization mechanisms for NR V2X," R1-1906012, 3GPP TSG RAN WG1 Meeting #97, May 2019, 15 pages.

Ericsson, "S-SSB design and synchronization protocol for NR SL," R1-1907141, 3GPP TSG RAN WG1 Meeting #97, May 2019, 12 pages.

European Patent Office Application Serial No. 20852984.2, Search Report dated Jun. 22, 2022, 11 pages.

Huawei, HiSilicon, "Sidelink synchronization mechanisms for NR V2X", 3GPP TSG RAN WG1 Ad-Hoc Meeting 1901, R1-190025, Jan. 2019, 12 pages.

* cited by examiner

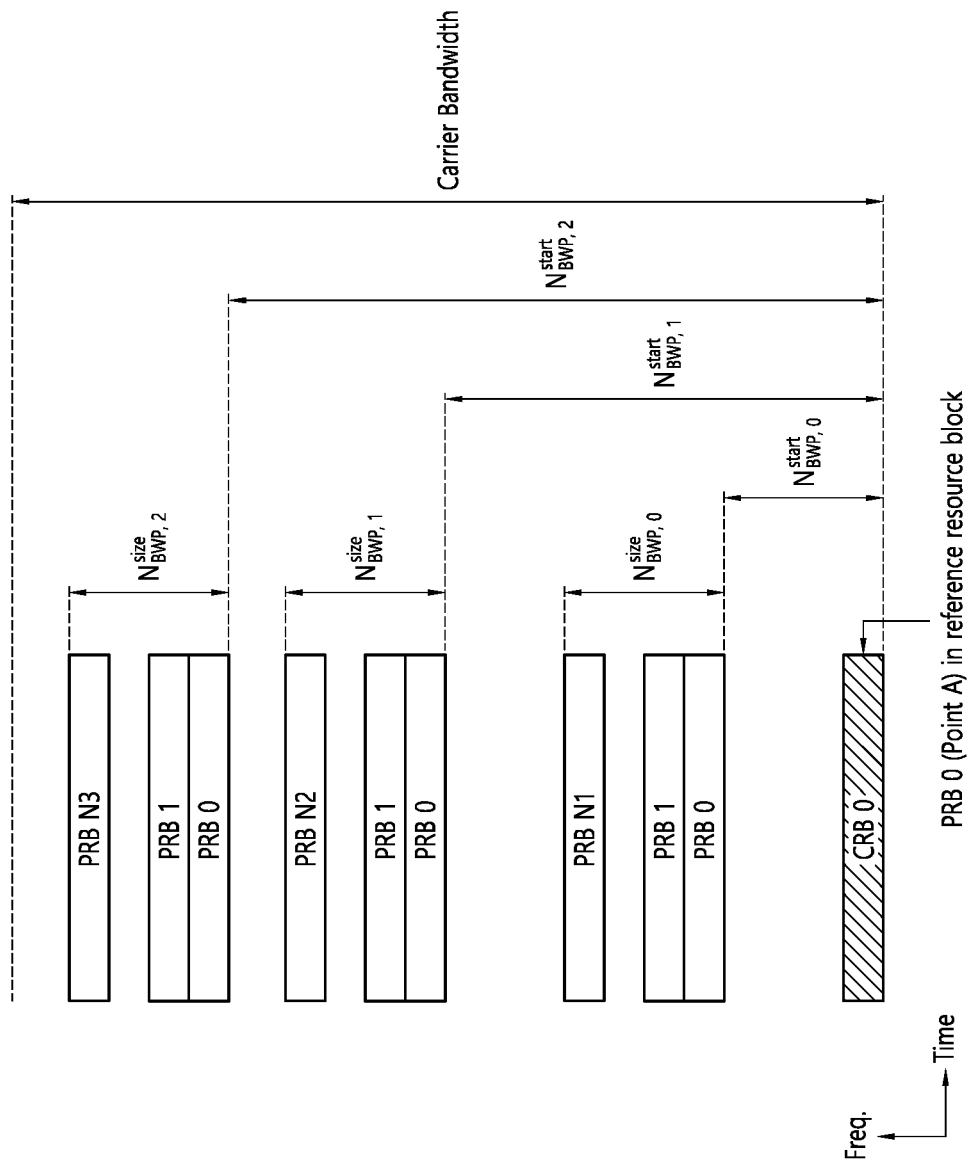

S1410

FIG. 16 receiving, from first device, first S-SSBs on first slots within first S-SSB period of S-SSB period length — S1610

METHOD AND APPARATUS FOR TRANSMITTING S-SSB IN NR V2X

CROSS-REFERENCE TO RELATED APPLICATIONS

This application is a continuation of International Application No. PCT/KR2020/010826, filed on Aug. 14, 2020, which claims the benefit of U.S. Provisional Patent Application No. 62/887,565 filed on Aug. 15, 2019, the contents of which are hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for transmitting sidelink synchronization signal blocks (S-SSBs) in NR V2X, and device(s) (or UE(s)) performing the method.

Technical Solutions

Based on an embodiment of the present disclosure, a method for performing sidelink (SL) communication by a first device may be provided. The method may comprise:

receiving, from a base station, information on sidelink synchronization signal block (S-SSB) transmission resources; determining a plurality of first slots within a first S-SSB period of an S-SSB period length, related to a plurality of first S-SSBs, based on the information on the S-SSB transmission resources; and transmitting, to a second device, the plurality of first S-SSBs on the plurality of first slots, wherein a slot interval between the plurality of first slots is a same within the first S-SSB period.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second device, the plurality of first S-SSBs on the plurality of first slots, wherein a slot interval between the plurality of first slots is a same within the first S-SSB period.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second UE, the plurality of first S-SSBs on the plurality of first slots, wherein a slot interval between the plurality of first slots is a same within the first S-SSB period.

Based on an embodiment of the present disclosure, a non-transitory computer-readable storage medium storing instructions may be provided. The instructions, when executed, may cause a first device to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second device, the plurality of first S-SSBs on the plurality of first slots, wherein a slot interval between the plurality of first slots is a same within the first S-SSB period.

Based on an embodiment of the present disclosure, a method for performing sidelink (SL) communication by a second device may be provided. The method may comprise: receiving, from a first device, a plurality of first S-SSBs on a plurality of first slots within a first S-SSB period of an S-SSB period length, wherein the plurality of first slots related to the plurality of first S-SSBs are determined by the first device based on information on S-SSB transmission resources received by the first device from a base station, and wherein a slot interval between the plurality of first slots is a same within the first S-SSB period.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a plurality of first S-SSBs on a plurality of first slots within a first S-SSB period of an S-SSB period length, wherein the plurality of first slots related to the plurality of first S-SSBs are determined by the first device based on information on S-SSB transmission resources received by the first device from a base station, and wherein a slot interval between the plurality of first slots is a same within the first S-SSB period.

Effects of the Disclosure

Based on the present disclosure, V2X communication between devices (or UEs) can be efficiently performed.

BRIEF DESCRIPTION OF THE DRAWINGS

FIG. 7 shows an example of a BWP, based on an embodiment of the present disclosure.

FIG. 16 shows operations of a base station, based on an embodiment of the present disclosure.

DESCRIPTION OF EXEMPLARY EMBODIMENTS

Figure 1:
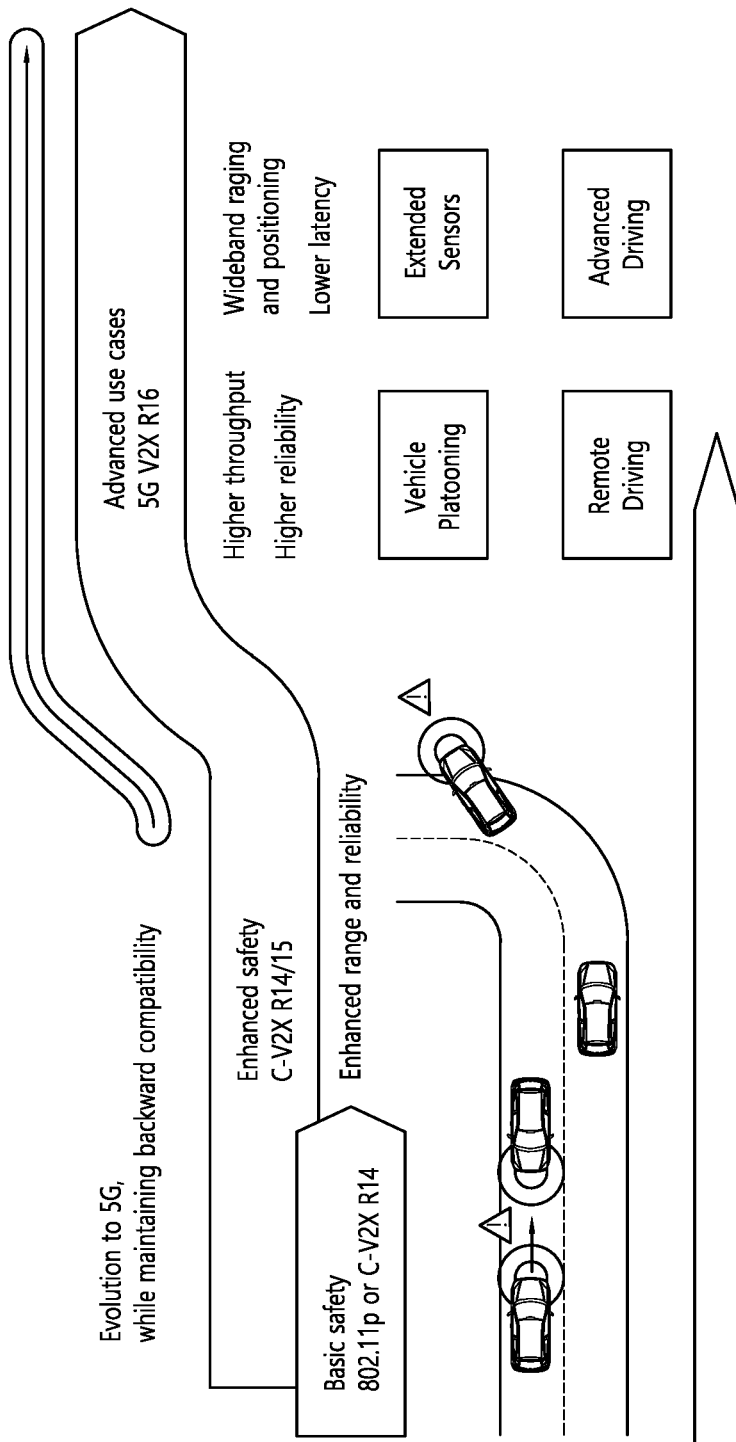
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
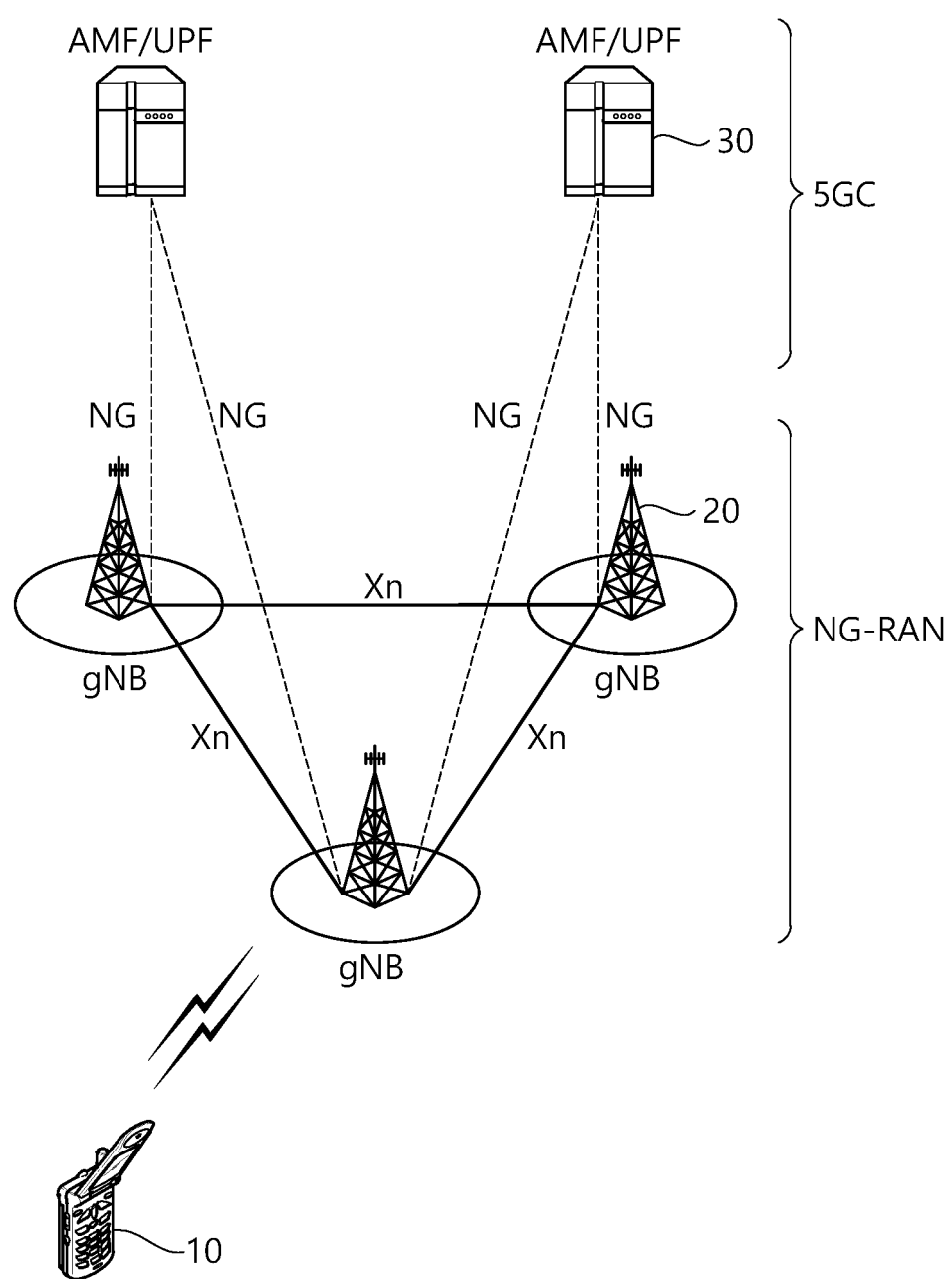
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
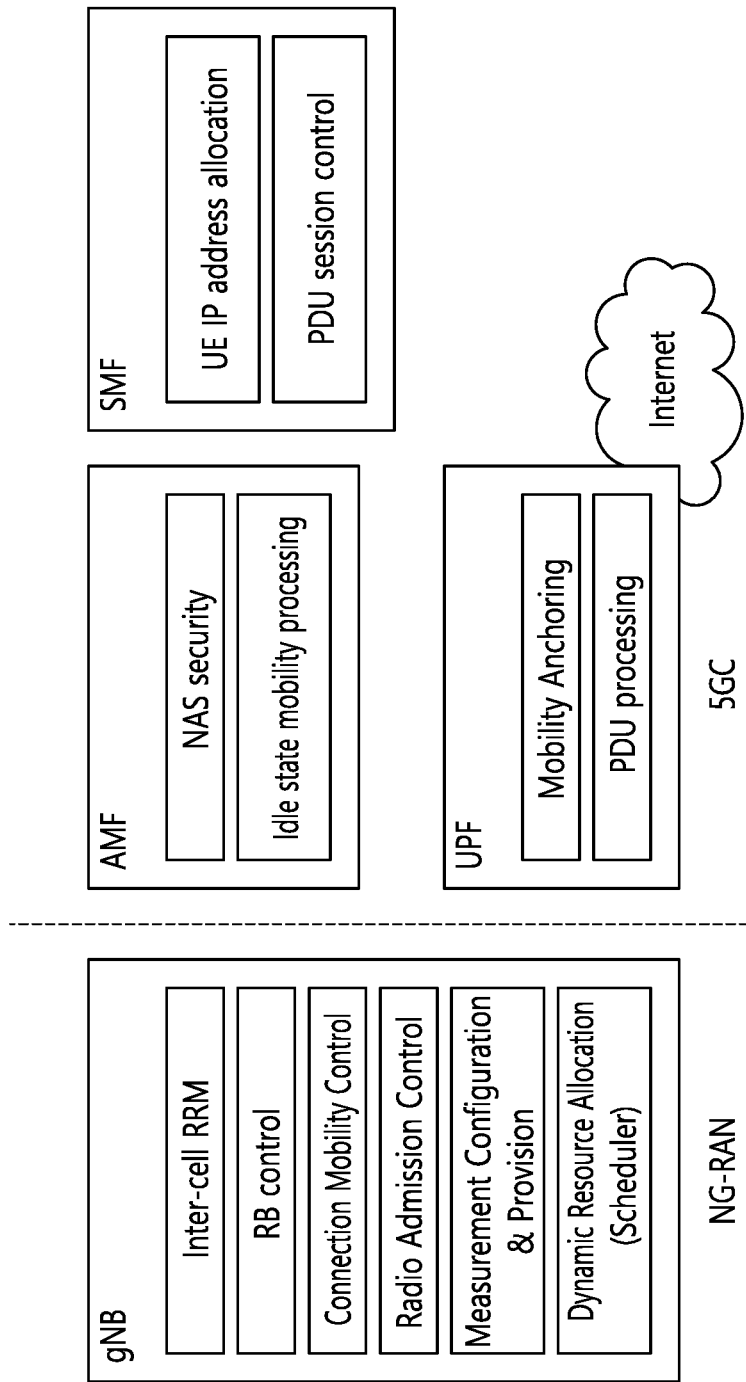
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
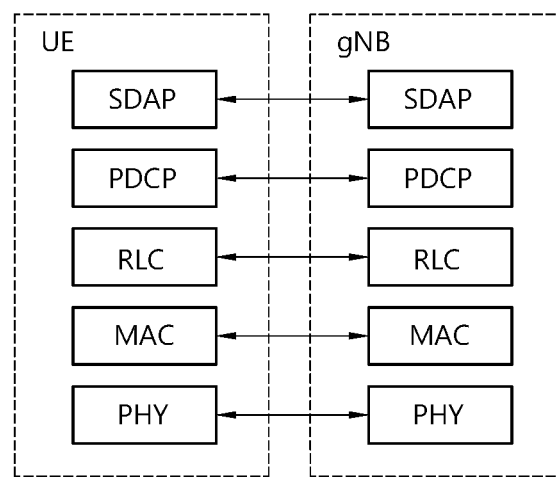
FIGS. 4A and 4B show a radio protocol architecture, based on an embodiment of the present disclosure.
Figure 4B:
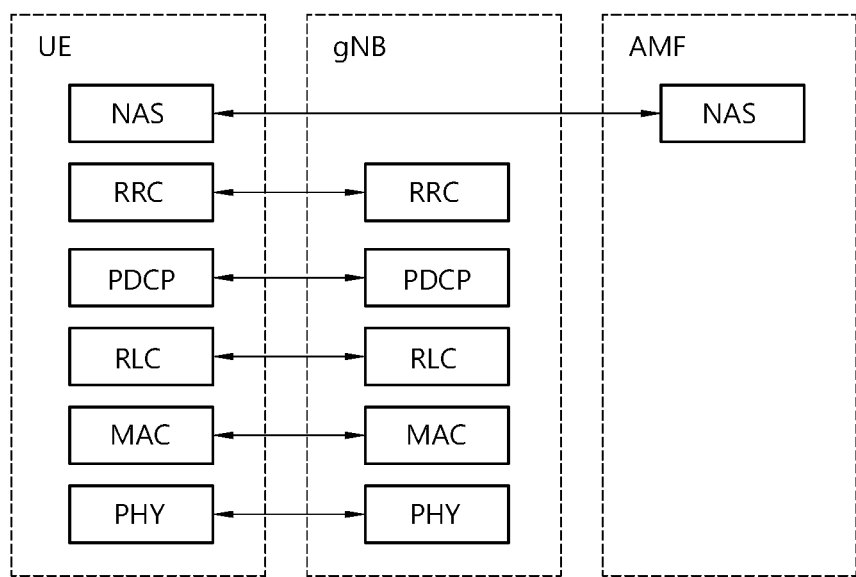

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
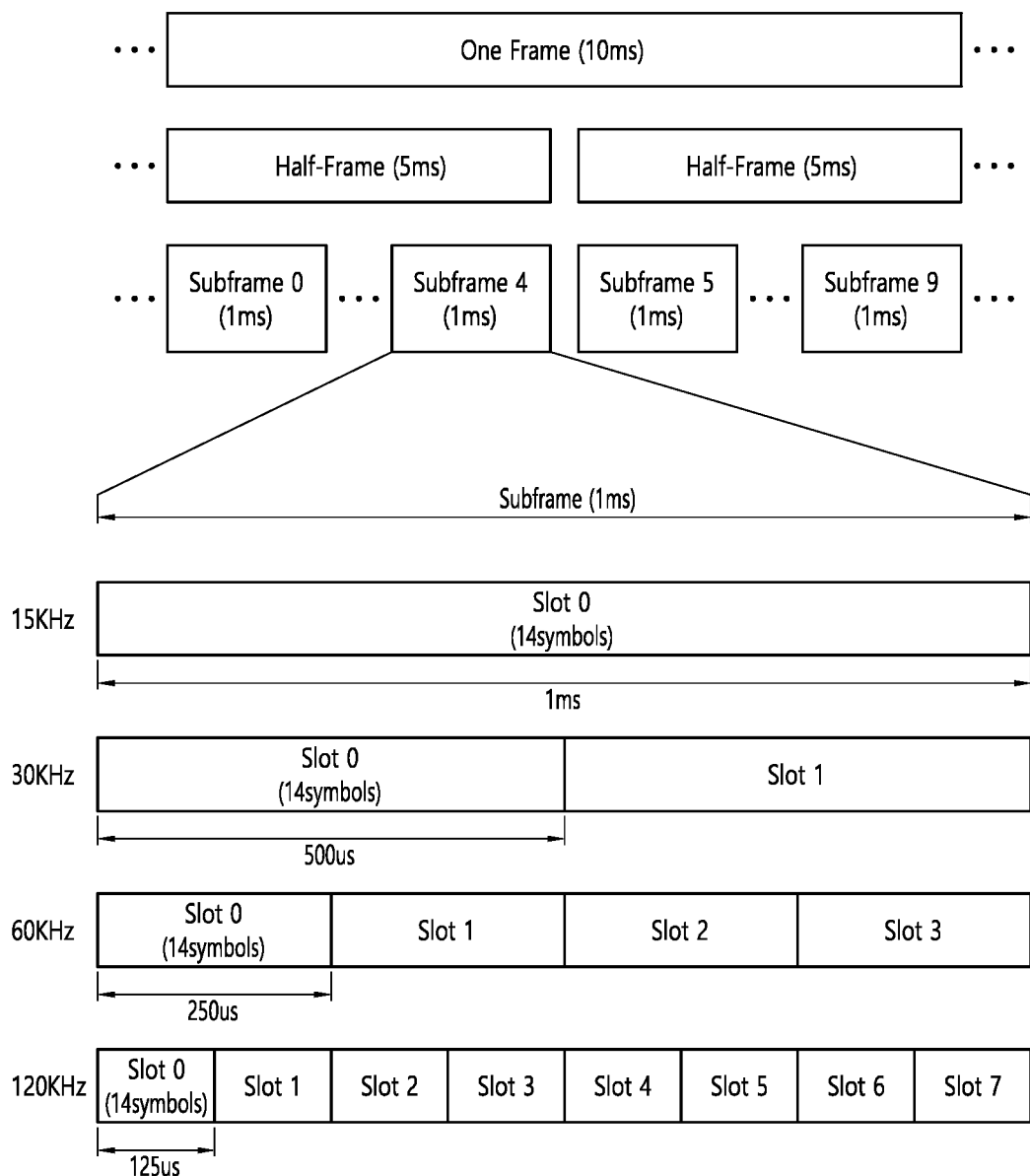
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
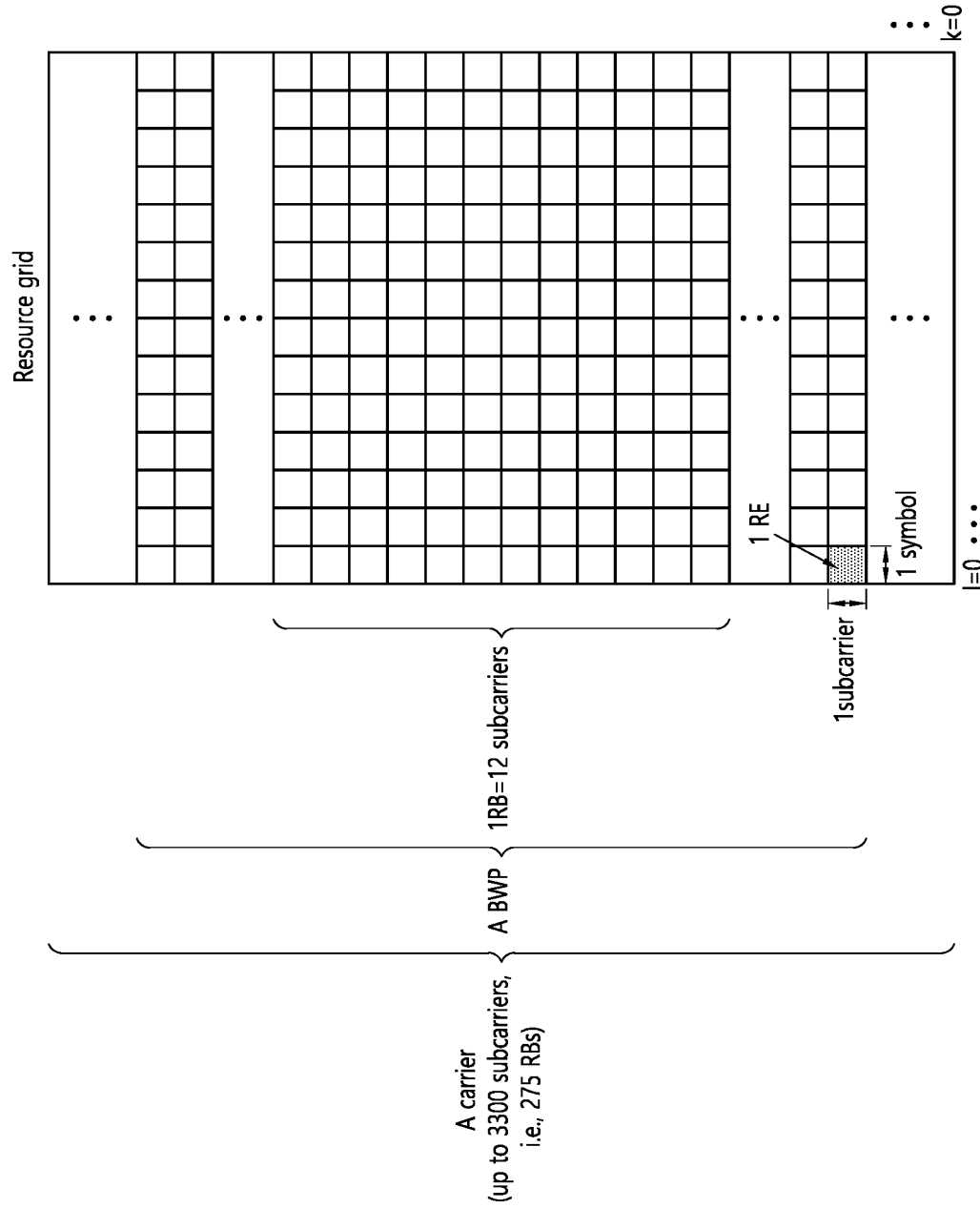
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
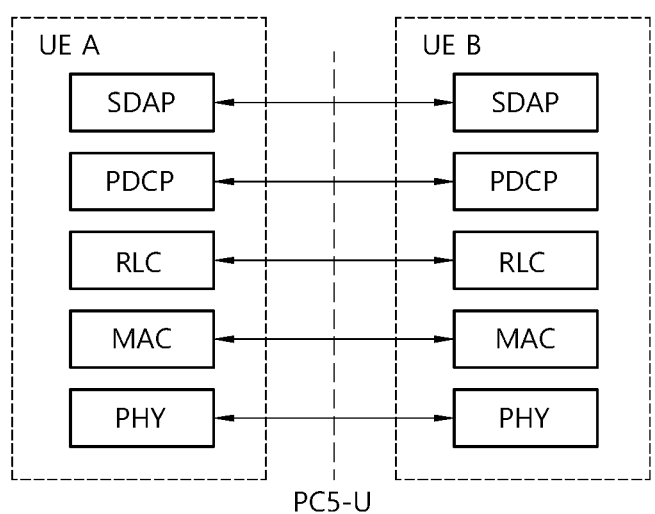
FIGS. 8A and 8B show a radio protocol architecture for a SL communication, based on an embodiment of the present disclosure.
Figure 8B:
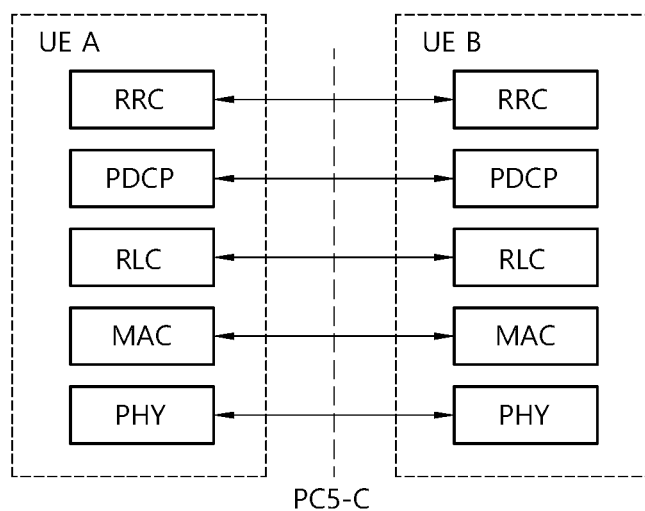

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
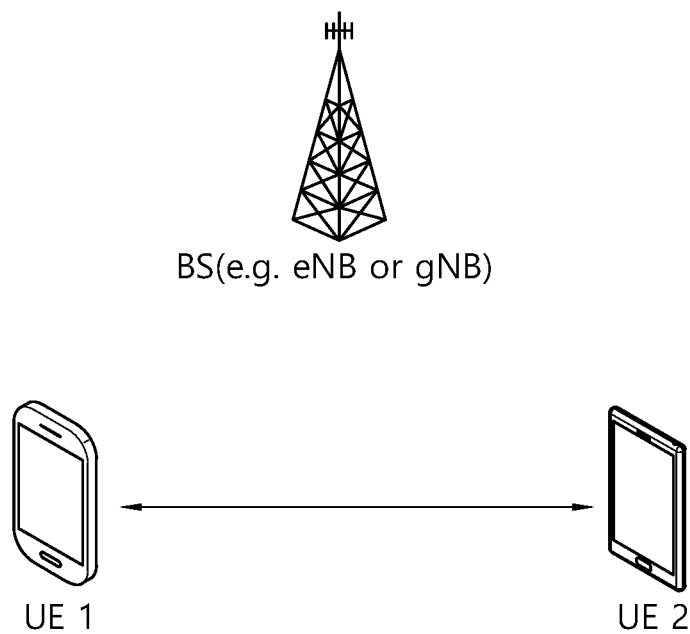
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
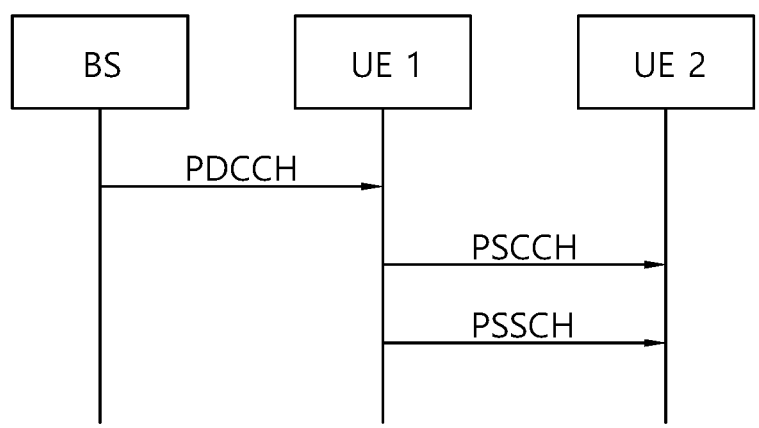
FIGS. 10A and 10B show a procedure of performing V2X or SL communication by a UE based on a transmission mode, based on an embodiment of the present disclosure.
Figure 10B:
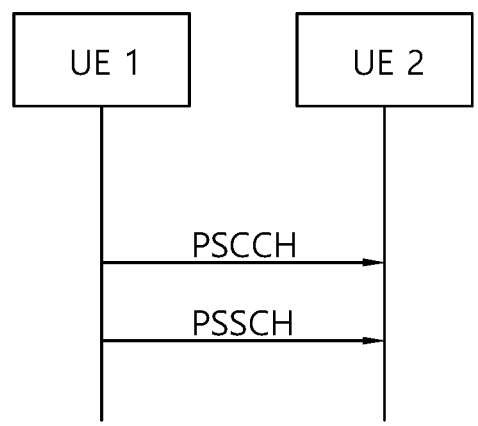

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
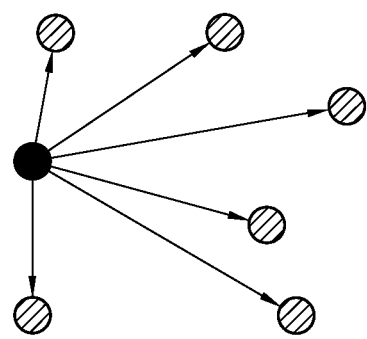
FIGS. 11A to 11C show three cast types, based on an embodiment of the present disclosure.
Figure 11B:
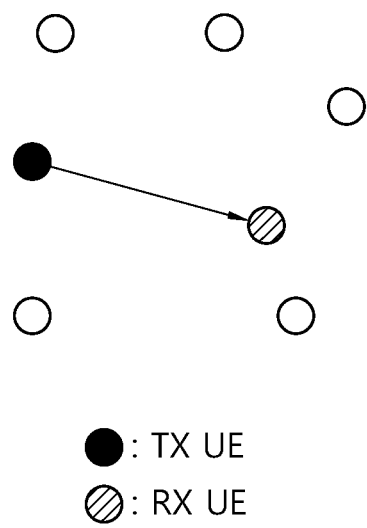
Figure 11C:
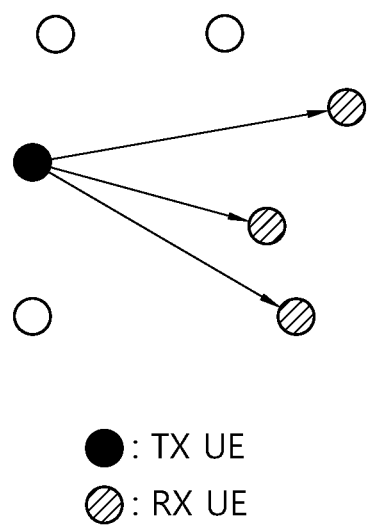

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

A sidelink synchronization signal block (S-SSB) or sidelink SS/PSBCH block used for initial access of a UE in the NR V2X communication system may include a sidelink primary synchronization signal (S-PSS), a sidelink secondary synchronization signal (S-SSS), and a sidelink physical broadcast channel (PSBCH). The S-PSS may be used by the UE to obtain initial signal detection and synchronization. The S-SSS may be used by the UE together with the S-PSS to obtain detailed synchronization and to detect a synchronization signal ID. The PSBCH may be a channel used by the UE to receive basic system information through a master information block (MIB). Accordingly, the S-PSS, the S-SSS, and the PSBCH included in the synchronization signal block may be important signals for the UE to obtain synchronization and basic system information, and for normal data communication, the UE may have to initially receive and decode the S-SSB. A transmitting UE may generate the PSBCH, for example, through the following processes ((1) to (8)).

(1) Generating a MIB by an upper layer and transferring it to an AS layer (2) Generating a PSBCH payload by adding information generated by the AS layer (3) Primary PSBCH scrambling (4) PSBCH channel coding (Forward Error Correction)

(5) PSBCH rate matching (fit the amount of information to the size of resources used for transmission)

(6) Secondary PSBCH scrambling (7) PSBCH modulation (8) Mapping the PSBCH to resource elements The transmitting UE may transmit the PSBCH generated through the above processes ((1) to (8)) to receiving UE(s).

The scrambling process for the PSBCH of the transmitting UE has the purpose of reducing a Peak-to-Average Power Ratio (PAPR) of OFDM signals and transmitting a time location of the S-SSB and a cell ID or an SLSS ID to receiving UE(s). The present disclosure proposes a method for effectively scrambling a PSBCH payload by a transmitting UE in sidelink communication.

The transmitting UE may transmit, for example, the following information ((1) to (3)) to receiving UE(s) through a PSBCH.

(1) Slot structure (TDD configuration)

(2) Frame number (3) Slot index

In the case of a Uu carrier and a SL carrier being shared, the slot structure may represent configuration information to which UL, DL, SL, and/or flexible slots/symbols are allocated by a base station for a certain time period such as a frame. For example, a frame number may be information representing the order of each frame in a super frame including 10240 frames. For example, if one frame has a time duration of 1 ms, the super frame occupies a time duration of 10240 ms, and the frame number may represent the time location of each frame within 10240 ms. The slot index may be information representing the order of a plurality of slots included in one frame. For example, in the case of a signal system having 15 kHz/30 kHz/60 kHz/120 kHz subcarrier spacing, the number of slots in one frame is 10/20/40/80, respectively, and one slot may include 14 symbols. Accordingly, the frame number may be configured to 10 bits and the slot index may be configured to 7 bits.

In the above embodiment, the MIB may include the slot structure and the frame number (or the most significant bit (MSB) part of the frame number), and a PSBCH payload other than the MIB includes the least significant bit (LSB) part of the frame number and the slot index (or the MSB part of the slot index). The LSB part of the slot index may be transmitted through a PSBCH demodulation reference signal (DM-RS) sequence used for channel estimation required for PSBCH decoding.

A plurality of S-SSBs may be transmitted within an S-SSB transmission period, and each S-SSB may be repeatedly transmitted within one period or all PSBCH payloads may be divided and transmitted within one period through different S-SSBs.

A pseudo-random sequence may be used for the primary scrambling performed before the channel coding for the PSBCH of the transmitting UE, and a sequence generation may reset for each S-SSB start point within one S-SSB transmission period, or it may be reset for each S-SSB transmission period. In this case, an initial value used for the sequence generation may be a SLSSID value or may be determined by using a SLSSID value. A scrambling sequence used for the PSBCH of each S-SSB may be generated by using an index representing the order of the S-SSB or the number of information bits to which scrambling is applied, including and the MIB and the LSB part of the slot index in which the PSBCH is transmitted. In this case, scrambling is not applied to the index representing the order of the S-SSB or the LSB part of the slot index in which the PSBCH is transmitted, which is used for the sequence generation.

Alternatively, the same scrambling sequence may be applied to PSBCHs of all S-SSBs within one S-SSB period, or the same scrambling sequence may be applied to PSBCHs of all S-SSBs regardless of the S-SSB period. Through this, a receiver can improve channel decoding performance by combining codewords for PSBCHs of S-SSBs repeatedly transmitted before channel decoding.

Alternatively, if a scrambling sequence is applied based on determined information to which scrambling is not applied, such as the index representing the order of S-SSB or the LSB part of the slot index in which the PSBCH is transmitted, a receiver may determine/identify scrambling sequence information applied before channel coding by a transmitter, before performing channel decoding. For example, if polar coding is used for channel coding, descrambling can be performed before channel coding if such scrambling sequence information is used. Through this, channel decoding performance may be improved by combining codewords to which different scrambling sequences are applied before channel coding. For example, since the index representing the order of the S-SSB or the LSB part of the slot index is also used to generate the PSBCH DM-RS sequence, corresponding information may be obtained through DM-RS detection.

A pseudo-random sequence may be used for the secondary scrambling performed after the channel coding for the PSBCH of the transmitting UE, and a sequence generation may reset for each S-SSB start point within one S-SSB transmission period, or it may be reset for each S-SSB transmission period. In this case, an initial value used for the sequence generation may be a SLSSID value or may be determined by using a SLSSID value. A scrambling sequence used for the PSBCH of each S-SSB may be generated by using an index representing the order of the S-SSB or the number of bits of the PSBCH codeword to which the channel coding is applied and the LSB part of the slot index in which the PSBCH is transmitted. In this case, scrambling is not applied to the index representing the order of the S-SSB or the LSB part of the slot index in which the PSBCH is transmitted, which is used for the sequence generation.

Alternatively, the same scrambling sequence may be applied to PSBCHs of all S-SSBs within one S-SSB period, or the same scrambling sequence may be applied to PSBCHs of all S-SSBs regardless of the S-SSB period. Through this, a receiver may obtain a combining gain for improving the SNR of received signals by combining codewords for PSBCHs of repeatedly transmitted S-SSBs.

Alternatively, if a scrambling sequence is applied based on determined information to which scrambling is not applied, such as the index representing the order of S-SSB or the LSB part of the slot index in which the PSBCH is transmitted, since a receiver can determine/identify scrambling sequence information in advance, the receiver can perform descrambling for combining. For example, since the index representing the order of the S-SSB or the LSB part of the slot index is also used to generate the PSBCH DM-RS sequence, corresponding information may be obtained through DM-RS detection.

Figure 12:
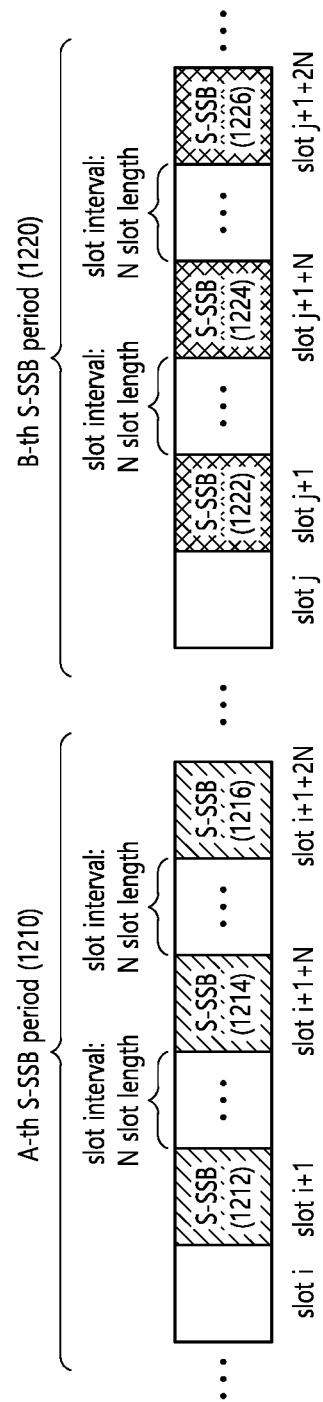
FIG. 12 shows an example in which a plurality of S-SSBs are transmitted within an S-SSB period.

FIG. 12 shows an example in which a plurality of S-SSBs are transmitted within an S-SSB period.

For example, one complete S-SSB signal may be transmitted in one slot, and a plurality of S-SSBs transmitted within an S-SSB transmission period may be transmitted through consecutive slots in a time domain, or a plurality of S-SSBs transmitted within an S-SSB transmission period may be transmitted through slots spaced apart by a certain time interval in a time domain. In this case, (pre-)configuration by a base station may be performed. For example, the location of the consecutive slots may be configured by the base station, or the location of slots spaced apart by the certain time interval may be configured by the base station, or information representing the certain time interval may be signaled (or configured).

In another embodiment, one complete S-SSB signal may be transmitted in one slot, and a plurality of S-SSBs transmitted within an S-SSB transmission period may be transmitted in the location of arbitrary slots in a time domain. In this case, the location of corresponding arbitrary slots may be (pre-)configured by a base station.

A first device according to an embodiment may receive information on sidelink synchronization signal block (S-SSB) transmission resource(s) from a base station. Based on the information on the S-SSB transmission resource(s), the first device may determine a plurality of first slots (slot i+1, slot i+1+N, slot i+1+2N, . . . ) within the A-th S-SSB period 1210 of a S-SSB period length, related to a plurality of first S-SSBs 1212, 1214, 1216. The first device may transmit the plurality of first S-SSBs 1212, 1214, 1216 on the plurality of first slots (slot i+1, slot i+1+N, slot i+1+2N, . . . ) to a second device. In this case, slot intervals between the plurality of first slots (slot i+1, slot i+1+N, slot i+1+2N, . . . ) may be the same as an N slot length within the A-th S-SSB period.

For example, the information on the S-SSB transmission resource(s) may include information on a slot interval.

For example, N in the slot interval (N slot length) may be 0 or a positive integer.

The first device according to an embodiment may determine the plurality of first slots (slot i+1, slot i+1+N, slot i+1+2N, . . . ), which are related to the plurality of first S-SSBs 1212, 1214, 1216, spaced apart by the slot interval (N slot length), based on the information on the slot interval (N slot length).

For example, each of the plurality of first SSBs 1212, 1214, 1216 may include a physical sidelink broadcast channel (PSBCH). The PSBCH may be generated based on the primary scrambling for the PSBCH and the secondary scrambling for the PSBCH.

For example, the primary scrambling for the PSBCH may be performed based on a pseudo-random sequence before PSBCH channel coding.

For example, the generation of the scrambling sequence related to the primary scrambling or the secondary scrambling may be reset for each start time of each transmission of the plurality of first S-SSBs 1212, 1214, 1216.

For example, the generation of the scrambling sequence related to the primary scrambling or the secondary scrambling may be reset for each S-SSB period length. That is, after the A-th S-SSB period 1210, the generation of the scrambling sequence related to the primary scrambling or the secondary scrambling may be reset, and after the B-th S-SSB period 1220, the generation of the scrambling sequence related to the primary scrambling or the secondary scrambling may be reset.

For example, at least one LSB of a slot index through which the PSBCH is transmitted or an S-SSB index representing each of the plurality of first S-SSBs 1212, 1214, 1216 may be used for generating the scrambling sequence for the primary scrambling or the secondary scrambling.

For example, scrambling may not be applied to at least one LSB of the slot index in which the PSBCH is transmitted or the S-SSB index.

For example, the same scrambling sequence may be applied to a plurality of first PSBCHs included in the plurality of first SSBs 1212, 1214, 1216 within the first S-SSB period.

Based on the information on the S-SSB transmission resource(s), the first device according to an embodiment may determine a plurality of second slots (slot j+1, slot j+1+N, slot j+1+N, . . . ) within the B-th S-SSB period 1220 of the S-SSB period length, related to a plurality of second S-SSBs 1222, 1224, 1226, and may transmit the plurality of second S-SSBs 1222, 1224, 1226 on the plurality of second slots (slot j+1, slot j+1+N, slot j+1+N, . . . ) to the second device.

For example, in the case of a plurality of first PSBCHs included in the plurality of first SSBs within the first S-SSB period and a plurality of second PSBCHs included in the plurality of second SSBs within the second S-SSB period, the same scrambling sequence may be applied.

For example, all S-SSBs within an S-SSB transmission period may be transmitted within one frame. Through this, the frame number included in the MIB has the same value within the S-SSB transmission period, so that a gain through combination can be obtained. Also, the MSB part of the slot index transmitted through the PSBCH payload may be configured to have the same value within the S-SSB transmission period. For example, MSB 4 bits of the slot index may be transmitted through the PSBCH payload, and LSB 3 bits of the slot index may be transmitted through the PSBCH DM-RS, and all S-SSBs within one S-SSB transmission period may be transmitted through consecutive slots. In this case, if the first S-SSB is transmitted through a slot having a slot index corresponding to a multiple of N (i.e., the number of S-SSBs transmitted within one S-SSB period), combining may be possible since the MSB 4 bits of the slot index transmitted through the PSBCH have the same value within one S-SSB transmission period. In addition, since the order of each S-SSB within one S-SSB period is sequentially determined from 0 to (N−1) by the LSB part of the slot index, a receiver which has detected an arbitrary S-SSB may determine the number of S-SSBs to be received thereafter. Through this, the receiver may not perform unnecessary blind detection for S-SSB detection.

In the above embodiment, if the location of the slot in which the first S-SSB is transmitted is arbitrarily determined within the frame, combining is not possible since the MSB part of the slot index transmitted through the PSBCH payload does not have the same value within one S-SSB transmission period. In this case, binding may be selectively performed only for MIB information maintaining the same value within the corresponding period. In this case, if all S-SSBs are continuously transmitted within one S-SSB transmission period, the period during which the S-SSB is transmitted within the S-SSB transmission period is signaled by higher layer signaling, so that a receiver which has detected any S-SSB may identify/determine the number of S-SSBs to be received thereafter.

The present disclosure proposes an efficient scrambling scheme applicable to PSBCH transmission. The proposed PSBCH scrambling scheme has the advantage of improving PSBCH decoding performance by combining PSBCHs transmitting the same PSBCH payload for each of the PSBCH scrambling applied before and after channel coding.

Figure 13:
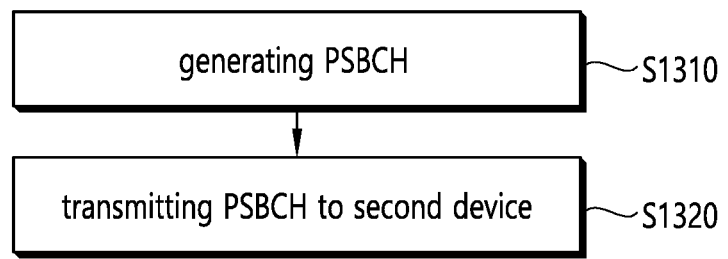
FIG. 13 shows a method for a first device to transmit a PSBCH to a second device, based on an embodiment of the present disclosure.

FIG. 13 shows a method for a first device to transmit a PSBCH to a second device, based on an embodiment of the present disclosure.

Referring to FIG. 13, in step S1310, the first device may generate the PSBCH. For example, the PSBCH may be generated based on various methods proposed in the present disclosure. For example, the generating the PSBCH may include at least one of generating a PSBCH payload, performing primary PSBCH scrambling, performing PSBCH channel coding, performing PSBCH rate matching, secondary PSBCH scrambling, performing PSBCH modulation, and/or mapping the PSBCH to resource elements. For example, the first device may perform the primary PSBCH scrambling based on various methods proposed in the present disclosure. For example, the first device may perform the secondary PSBCH scrambling based on various methods proposed in the present disclosure.

In step S1320, the first device may transmit the PSBCH to the second device.

Various embodiments proposed in the present disclosure may be applied to the device(s) described below. First, the processor of the first device may generate the PSBCH. In addition, the processor of the first device may control the transceiver to transmit the PSBCH to the second device.

Figure 14:
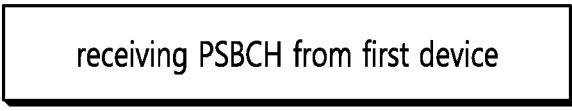
FIG. 14 shows a method for a second device to receive a PSBCH from a first device, based on an embodiment of the present disclosure.

FIG. 14 shows a method for a second device to receive a PSBCH from a first device, based on an embodiment of the present disclosure.

Referring to FIG. 14, in step S1410, the second device may receive the PSBCH from the first device.

For example, the PSBCH may be generated by the first device based on various methods proposed in the present disclosure. For example, the generating the PSBCH by the first device may include at least one of generating a PSBCH payload, performing primary PSBCH scrambling, performing PSBCH channel coding, performing PSBCH rate matching, performing secondary PSBCH scrambling, performing PSBCH modulation, and/or mapping the PSBCH to resource elements. For example, the primary PSBCH scrambling may be performed by the first device based on various methods proposed in the present disclosure. For example, the secondary PSBCH scrambling may be performed by the first device based on various methods proposed in the present disclosure.

Various embodiments proposed in the present disclosure may be applied to the device(s) described below. The processor of the second device may control the transceiver to receive the PSBCH from the first device.

Figure 15:
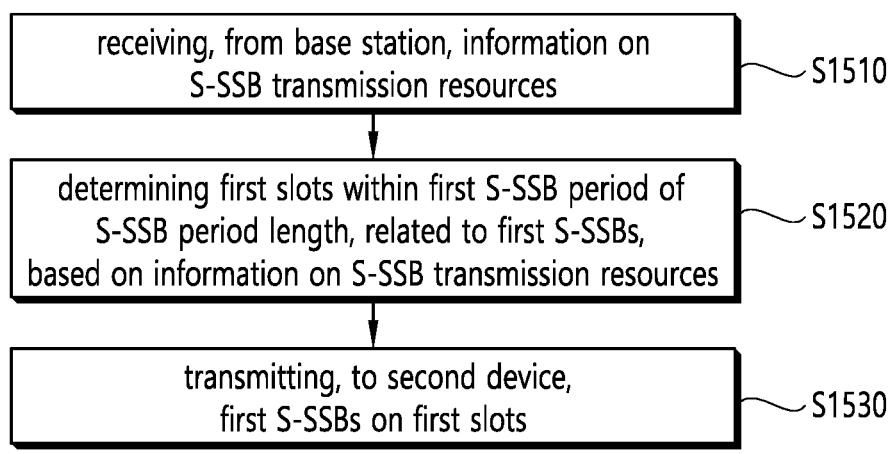
FIG. 15 shows operations of a first device, based on an embodiment of the present disclosure.

FIG. 15 shows operations of a first device, based on an embodiment of the present disclosure.

The operations disclosed in the flowchart of FIG. 15 may be performed in combination with various embodiments of the present disclosure. For example, the operations disclosed in the flowchart of FIG. 15 may be performed based on at least one of devices illustrated in FIGS. 17 to 22. For example, the first device of FIG. 15 may be the first wireless device 100 of FIG. 18 to be described later. In another example, the first device of FIG. 15 may be the second wireless device 200 of FIG. 18 to be described later.

In step S1510, the first device according to an embodiment may receive, from a base station, information on sidelink synchronization signal block (S-SSB) transmission resources.

In step S1520, the first device according to an embodiment may determine a plurality of first slots within a first S-SSB period of an S-SSB period length, related to a plurality of first S-SSBs, based on the information on the S-SSB transmission resources.

In step S1530, the first device according to an embodiment may transmit, to a second device, the plurality of first S-SSBs on the plurality of first slots.

For example, a slot interval between the plurality of first slots may be a same within the first S-SSB period.

For example, the information on the S-SSB transmission resources may include information on the slot interval.

The first device according to an embodiment may determine the plurality of first slots spaced apart by the slot interval, related to the plurality of first S-SSBs, based on the information on the slot interval.

For example, each of the plurality of first SSBs may include a physical sidelink broadcast channel (PSBCH). The PSBCH may be generated based on primary scrambling for the PSBCH and secondary scrambling for the PSBCH.

For example, a generation of a scrambling sequence related to the primary scrambling or the secondary scrambling may be reset for each start time of transmission of each of the plurality of first S-SSBs.

For example, a generation of a scrambling sequence related to the primary scrambling or the secondary scrambling may be reset for each S-SSB period length.

For example, at least one LSB of a slot index in which the PSBCH is transmitted or an S-SSB index representing each of the plurality of first S-SSBs may be used for generating a scrambling sequence related to the primary scrambling or the secondary scrambling. Scrambling may not be applied to the at least one LSB of the slot index in which the PSBCH is transmitted or the S-SSB index.

For example, a same scrambling sequence may be applied to a plurality of first PSBCHs included in the plurality of first SSBs within the first S-SSB period.

The first device according to an embodiment may determine a plurality of second slots within a second S-SSB period of the S-SSB period length, related to a plurality of second S-SSBs, based on the information on the S-SSB transmission resources. In addition, the first device may transmit, to the second device, the plurality of second S-SSBs on the plurality of second slots. For example, a same scrambling sequence may be applied to a plurality of first PSBCHs included in the plurality of first SSBs within the first S-SSB period and a plurality of second PSBCHs included in the plurality of second SSBs within the second S-SSB period.

For example, all PSBCH payloads of PSBCHs for the plurality of first S-SSBs may be divided into the plurality of first S-SSBs.

For example, the plurality of first S-SSBs within the first S-SSB period may be transmitted to the second device through consecutive slots. For example, a minimum index value among slot index values of the plurality of first slots in which the plurality of first S-SSBs may be transmitted is a multiple of a total number of the first S-SSBs.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second device, the plurality of first S-SSBs on the plurality of first slots, wherein a slot interval between the plurality of first slots is a same within the first S-SSB period.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second UE, the plurality of first S-SSBs on the plurality of first slots, wherein a slot interval between the plurality of first slots is a same within the first S-SSB period.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, a non-transitory computer-readable storage medium storing instructions may be provided. The instructions, when executed, may cause a first device to: receive, from a base station, information on sidelink synchronization signal block (S-SSB) transmission resources; determine a plurality of first slots within a first S-SSB period of an S-SSB period length, related to a plurality of first S-SSBs, based on the information on the S-SSB transmission resources; and transmit, to a second device, the plurality of first S-SSBs on the plurality of first slots, wherein a slot interval between the plurality of first slots is a same within the first S-SSB period.

FIG. 16 shows operations of a second device, based on an embodiment of the present disclosure.

The operations disclosed in the flowchart of FIG. 16 may be performed in combination with various embodiments of the present disclosure. For example, the operations disclosed in the flowchart of FIG. 16 may be performed based on at least one of devices illustrated in FIGS. 17 to 22. For example, the second device of FIG. 16 may be the second wireless device 200 of FIG. 18 to be described later. In another example, the second device of FIG. 16 may be the first wireless device 100 of FIG. 18 to be described later.

In step S1610, the second device according to an embodiment may receive, from a first device, a plurality of first S-SSBs on a plurality of first slots within a first S-SSB period of an S-SSB period length.

For example, the plurality of first slots related to the plurality of first S-SSBs may be determined by the first device based on information on S-SSB transmission resources received by the first device from a base station.

For example, a slot interval between the plurality of first slots may be a same within the first S-SSB period.

For example, the information on the S-SSB transmission resources may include information on the slot interval.

For example, each of the plurality of first SSBs may include a PSBCH. The PSBCH may be generated based on primary scrambling for the PSBCH and secondary scrambling for the PSBCH performed by the first device.

For example, at least one LSB of a slot index in which the PSBCH is transmitted or an S-SSB index representing each of the plurality of first S-SSBs may be used for generating a scrambling sequence related to the primary scrambling or the secondary scrambling performed by the first device.

For example, scrambling may not be applied to the at least one LSB of the slot index in which the PSBCH is transmitted or the S-SSB index.

The second device according to an embodiment may combine codewords for first PSBCHs included in the received plurality of first S-SSBs, based on generating the scrambling sequence by the first device based on the at least one LSB of the slot index in which the PSBCH is transmitted or the S-SSB index.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a plurality of first S-SSBs on a plurality of first slots within a first S-SSB period of an S-SSB period length, wherein the plurality of first slots related to the plurality of first S-SSBs are determined by the first device based on information on S-SSB transmission resources received by the first device from a base station, and wherein a slot interval between the plurality of first slots is a same within the first S-SSB period.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
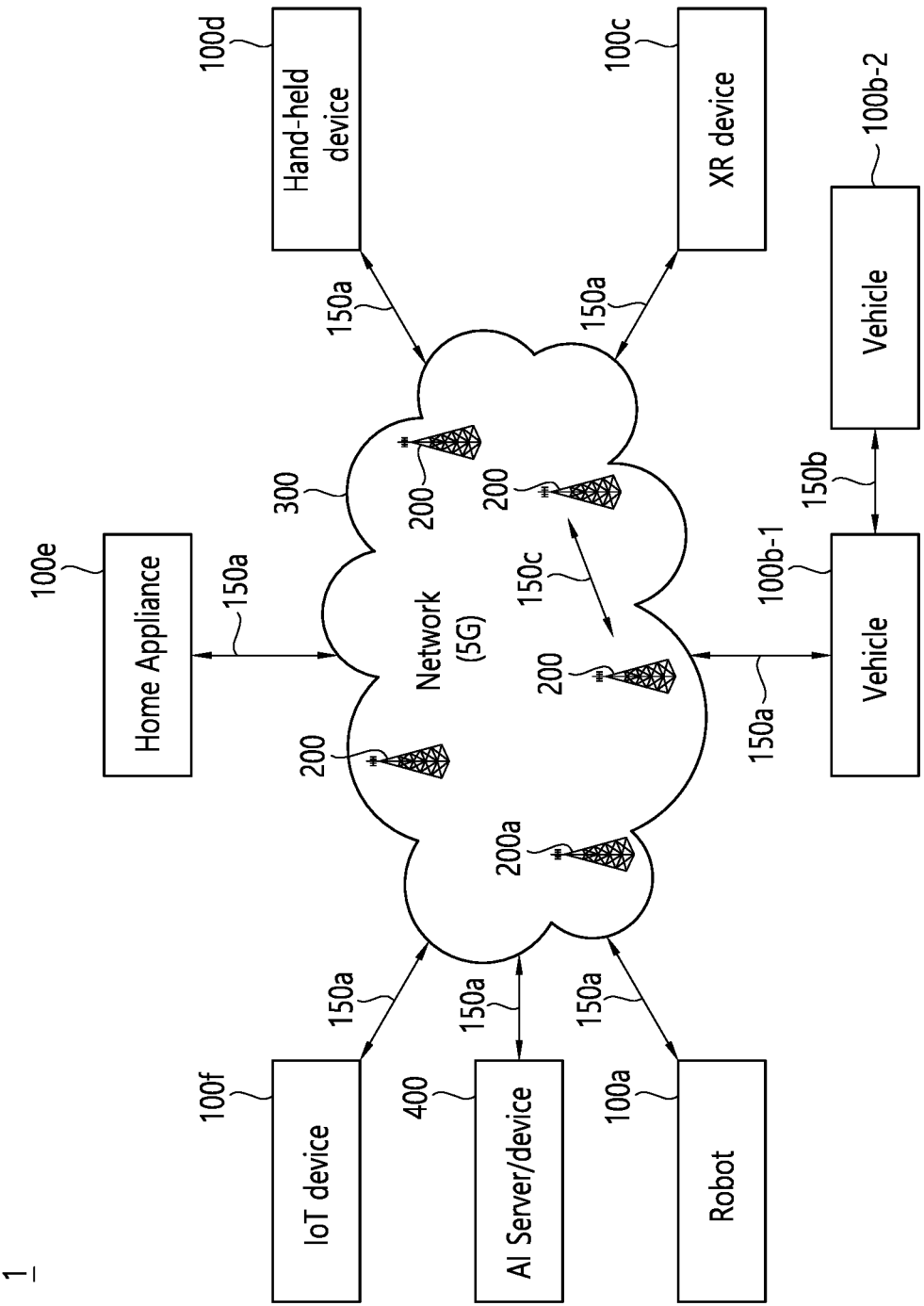
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100$a$, vehicles 100$b$-1 and 100$b$-2, an eXtended Reality (XR) device 100$c$, a hand-held device 100$d$, a home appliance 100$e$, an Internet of Things (IoT) device 100$f$, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200$a$ may operate as a BS/network node with respect to other wireless devices.

Herein, wireless communication technology implemented in wireless devices 100$a$ to 100$f$ of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100$a$ to 100$f$ of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100$a$ to 100$f$ of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100$a$ to 100$f$ may be connected to the network 300 via the BSs 200. An AI technology may be applied to the wireless devices 100$a$ to 100$f$ and the wireless devices 100$a$ to 100$f$ may be connected to the AI server 400 via the network 300. The network 300 may be configured using a 3G network, a 4G (e.g., LTE) network, or a 5G (e.g., NR) network. Although the wireless devices 100$a$ to 100$f$ may communicate with each other through the BSs 200/network 300, the wireless devices 100$a$ to 100$f$ may perform direct communication (e.g., sidelink communication) with each other without passing through the BSs/network. For example, the vehicles 100$b$-1 and 100$b$-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100$a$ to 100$f$.

Wireless communication/connections 150$a$, 150$b$, or 150$c$ may be established between the wireless devices 100$a$ to 100$f$/BS 200, or BS 200/BS 200. Herein, the wireless communication/connections may be established through various RATs (e.g., 5G NR) such as uplink/downlink communication 150$a$, sidelink communication 150$b$ (or, D2D communication), or inter BS communication (e.g., relay, Integrated Access Backhaul (IAB)). The wireless devices and the BSs/the wireless devices may transmit/receive radio signals to/from each other through the wireless communication/connections 150$a$ and 150$b$. For example, the wireless communication/connections 150$a$ and 150$b$ may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
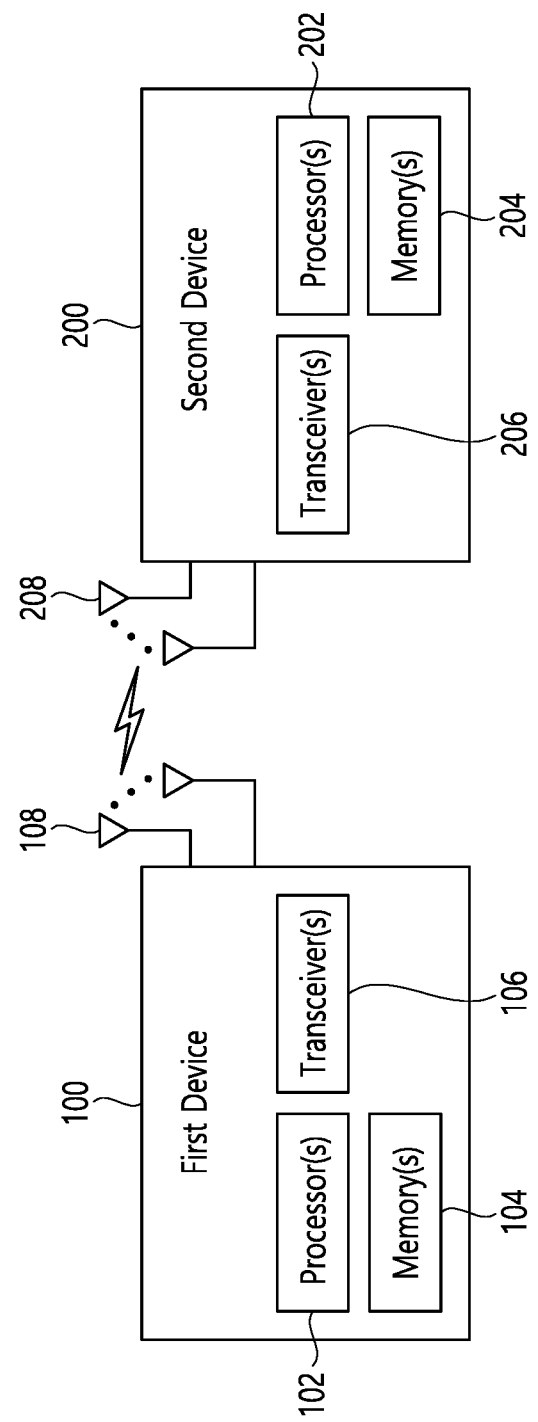
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
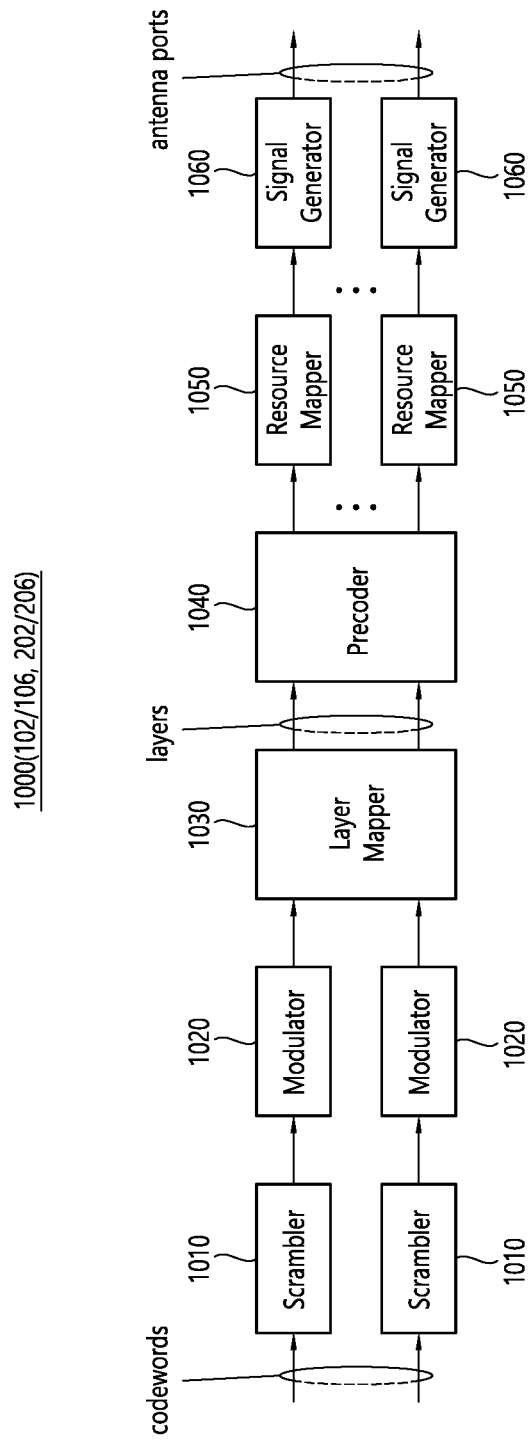
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
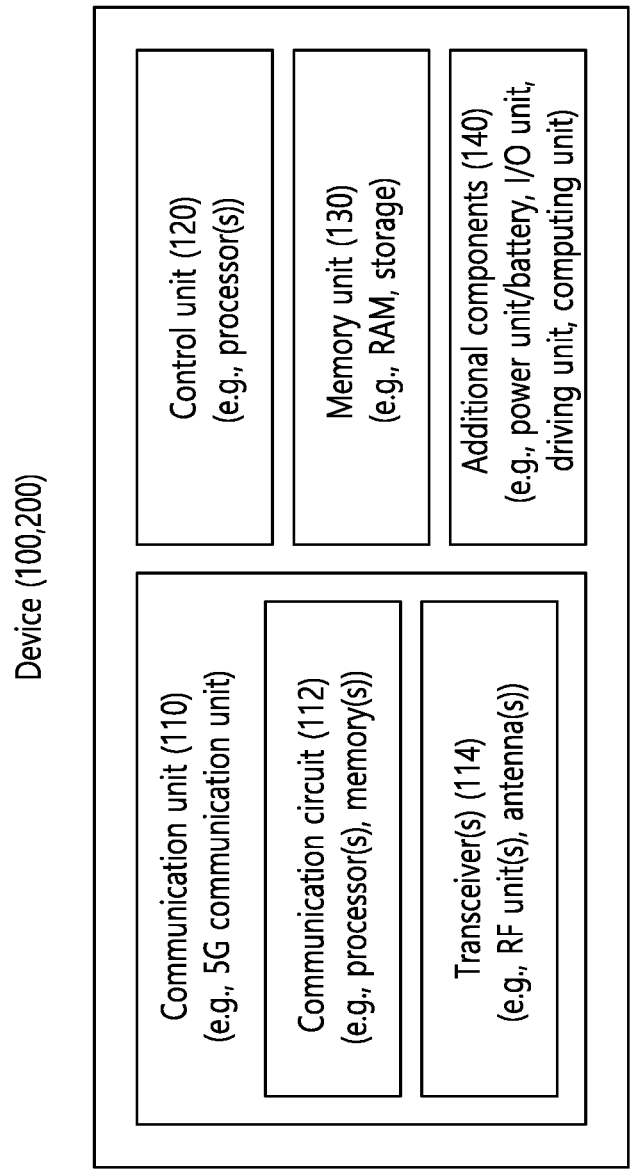
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
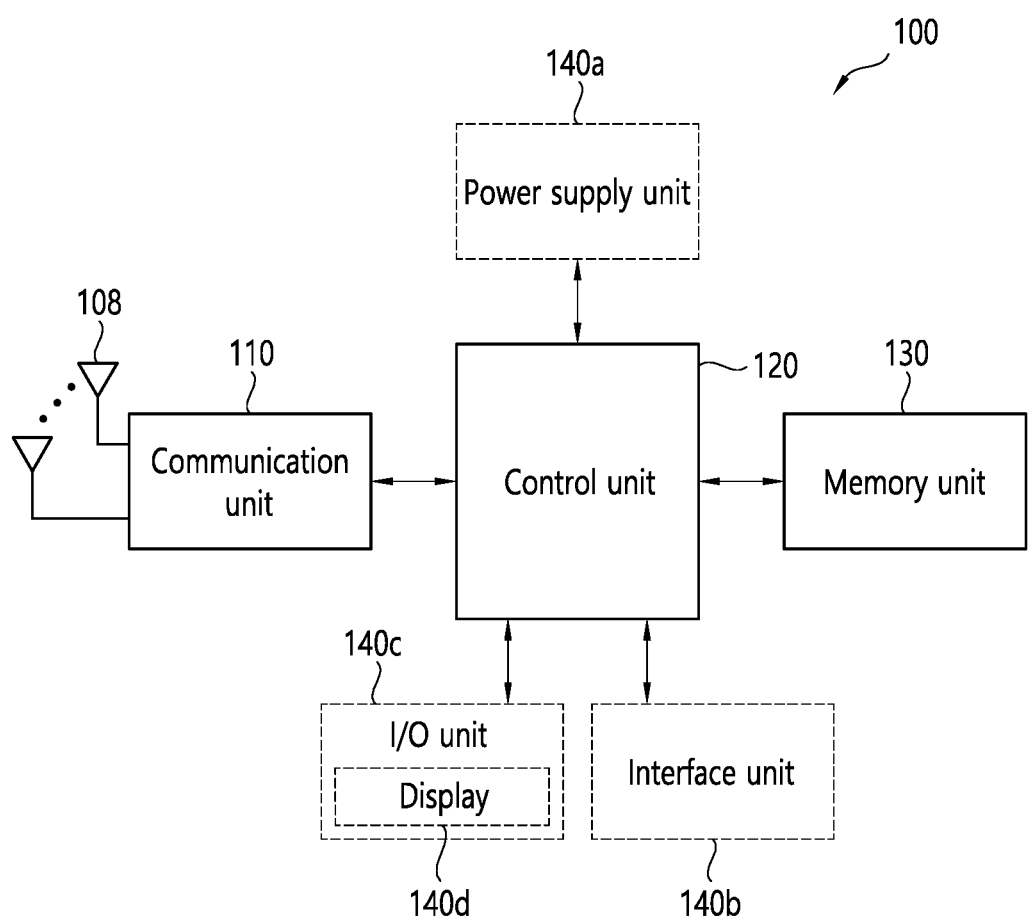
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
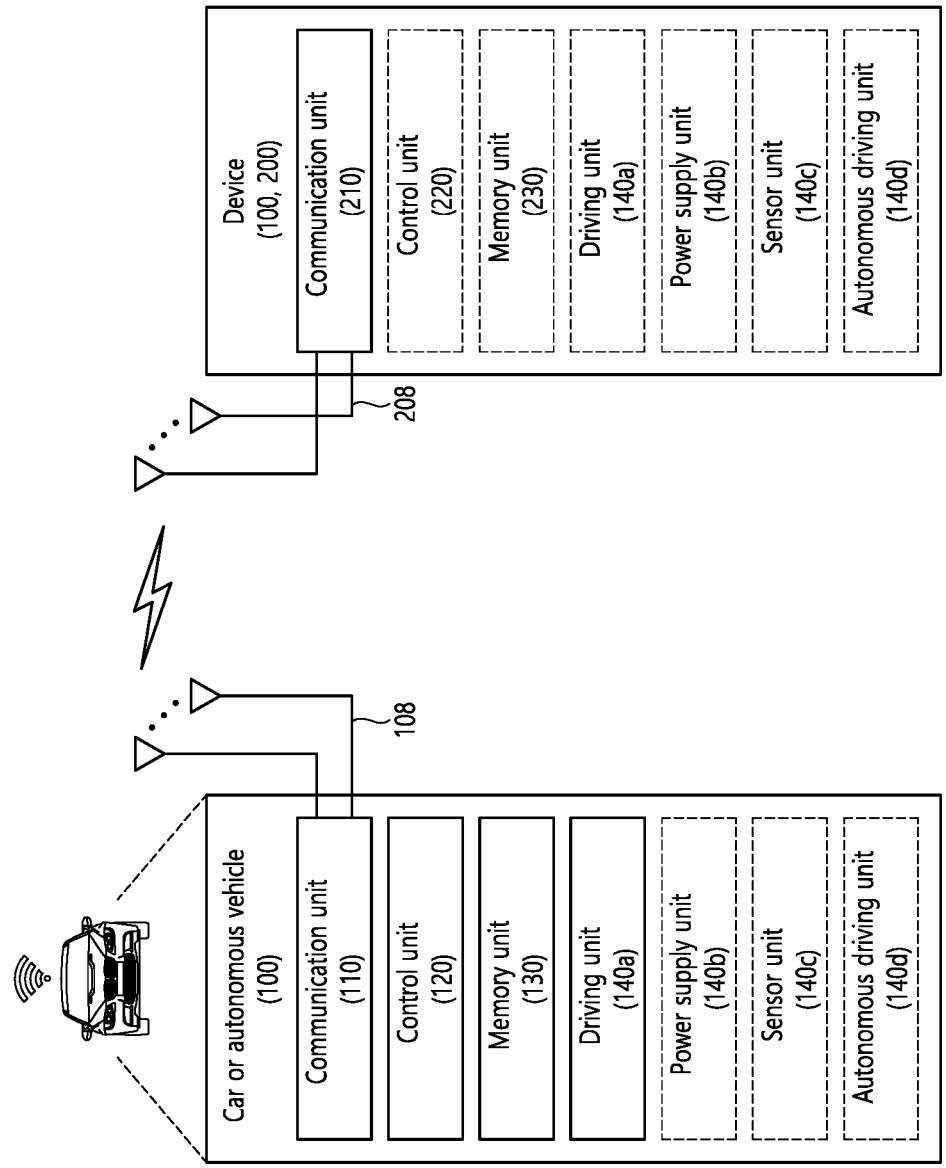
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication by a first device, the method comprising:
   obtaining first information on sidelink synchronization signal block (S-SSB) transmission resources;
   determining a plurality of first slots in a first S-SSB period, related to a plurality of first S-SSBs, based on the first information on the S-SSB transmission resources,
   wherein a slot interval between the plurality of first slots is a constant, in the first S-SSB period,
   wherein each of the plurality of first SSBs includes a physical sidelink broadcast channel (PSBCH),
   wherein the PSBCH is generated based on scrambling for the PSBCH, and
   wherein a same scrambling sequence is applied to a plurality of first PSBCHs included in the plurality of first SSBs in the first S-SSB period; and
   transmitting, to a second device, the plurality of first S-SSBs on the plurality of first slots.

2. The method of claim 1, wherein the first information on the S-SSB transmission resources includes information on the slot interval.

3. The method of claim 2, wherein determining the plurality of first slots comprises: determining the plurality of first slots spaced apart by the slot interval, related to the plurality of first S-SSBs, based on the information on the slot interval.

4. The method of claim 1, wherein a generation of a scrambling sequence related to the primary scrambling or the secondary scrambling is reset for each start time of transmission of each of the plurality of first S-SSBs.

5. The method of claim 1, wherein a generation of a scrambling sequence related to the primary scrambling or the secondary scrambling is reset for each S-SSB period length.

6. The method of claim 1,
   wherein at least one LSB of a slot index in which the PSBCH is transmitted or an S-SSB index representing each of the plurality of first S-SSBs is used for generating a scrambling sequence related to the primary scrambling or the secondary scrambling, and
   wherein scrambling is not applied to the at least one LSB of the slot index in which the PSBCH is transmitted or the S-SSB index.

7. The method of claim 1, further comprising:
   determining a plurality of second slots in a second S-SSB period, related to a plurality of second S-SSBs, based on the first information on the S-SSB transmission resources; and
   transmitting, to the second device, the plurality of second S-SSBs on the plurality of second slots,
   wherein a same scrambling sequence is applied to a plurality of first PSBCHs included in the plurality of first SSBs in the first S-SSB period and a plurality of second PSBCHs included in the plurality of second SSBs in the second S-SSB period,
   wherein the plurality of second slots, the second S-SSB period and the plurality of second S-SSBs are different from the plurality of first slots, the first S-SSB period and the plurality of first S-SSBs, respectively.

8. The method of claim 1, wherein all PSBCH payloads of PSBCHs for the plurality of first S-SSBs is divided into the plurality of first S-SSBs.

9. The method of claim 1,
   wherein the plurality of first S-SSBs in the first S-SSB period are transmitted to the second device through consecutive slots, and
   wherein a minimum index value among slot index values of the plurality of first slots in which the plurality of first S-SSBs are transmitted is a multiple of a total number of the first S-SSBs.

10. The method of claim 1, further comprising:
    obtaining, second information on S-SSB transmission resources;

determining a plurality of second slots in a second S-SSB period, related to a plurality of second S-SSBs, based on the second information on the S-SSB transmission resources; and transmitting, to the second device, the plurality of second S-SSBs on the plurality of second slots, wherein the second information, the plurality of second slots, the second S-SSB period and the plurality of second S-SSBs are different from the first information, the plurality of first slots, the first S-SSB period and the plurality of first S-SSBs, respectively.

11. The method of claim 10, wherein the slot interval between the plurality of first slots in the first S-SSB period is different from a slot interval between the plurality of second S-SSBs on the plurality of second slots.

12. The method of claim 10, wherein the slot interval between the plurality of first slots in the first S-SSB period is equal to a slot interval between the plurality of second S-SSBs on the plurality of second slots.

13. A first device configured to perform sidelink (SL) communication, the first device comprising:
at least one memory storing instructions;
at least one transceiver; and
at least one processor connected to the at least one memory and the at least one transceiver, wherein the at least one processor executes the instructions to:
obtain first information on sidelink synchronization signal block (S-SSB) transmission resources;
determine a plurality of first slots in a first S-SSB period, related to a plurality of first S-SSBs, based on the first information on the S-SSB transmission resources,
wherein a slot interval between the plurality of first slots is a constant, in the first S-SSB period,
wherein each of the plurality of first SSBs includes a physical sidelink broadcast channel (PSBCH),
wherein the PSBCH is generated based on scrambling for the PSBCH, and
wherein a same scrambling sequence is applied to a plurality of first PSBCHs included in the plurality of first SSBs in the first S-SSB period; and
transmit, to a second device, the plurality of first S-SSBs on the plurality of first slots.

14. The first device of claim 13, wherein the first information on the S-SSB transmission resources includes information on the slot interval.

15. The first device of claim 14, wherein the plurality of first slots are determined to be spaced apart by the slot interval, related to the plurality of first S-SSBs, based on the information on the slot interval.

16. An apparatus configured to control a first user equipment (UE), the apparatus comprising:
at least one processor; and
at least one memory connected to the at least one processor and storing instructions, wherein the at least one processor executes the instructions to:
obtain first information on sidelink synchronization signal block (S-SSB) transmission resources;
determine a plurality of first slots in a first S-SSB period, related to a plurality of first S-SSBs, based on the first information on the S-SSB transmission resources,
wherein a slot interval between the plurality of first slots is a constant, in the first S-SSB period,
wherein each of the plurality of first SSBs includes a physical sidelink broadcast channel (PSBCH),
wherein the PSBCH is generated based on scrambling for the PSBCH, and
wherein a same scrambling sequence is applied to a plurality of first PSBCHs included in the plurality of first SSBs in the first S-SSB period; and
transmit, to a second UE, the plurality of first S-SSBs on the plurality of first slots.

17. The apparatus of claim 16, wherein the first information on the S-SSB transmission resources includes information on the slot interval.

18. The apparatus of claim 17, wherein the plurality of first slots are determined to be spaced apart by the slot interval, related to the plurality of first S-SSBs, based on the information on the slot interval.

* * * * *